United States Patent Office 3,470,074
Patented Sept. 30, 1969

1

3,470,074
DEPOSITING ZINC COATINGS
Josef H. Schick, Obersdorf uber Siegen, Germany, assignor to Siemag Siegener Maschinenbau G.m.b.H., a corporation of Germany
No Drawing. Filed Aug. 18, 1965, Ser. No. 480,759
Claims priority, application Germany, Aug. 18, 1964, Sch 35,639; Jan. 26, 1965, M 63,931; Feb. 24, 1965, M 64,300; Aug. 4, 1965, M 66,208
Int. Cl. C23b 5/10, 5/46
U.S. Cl. 204—55          14 Claims

ABSTRACT OF THE DISCLOSURE

A process for producing zinc coatings on more noble metals includes passing an electrode current to a cathode of the object to be coated from an anode of a zinc metal through an aqueous solution which contains at least one salt of the less noble metal, a base, an acid, and a reducing agent with the pH value of the aqueous solution being at least five, with the voltage corresponding to at least the potential differences between the coating and the coated metals but being below the decomposition voltage of the water.

---

It is generally known that metal coatings can be produced on other metals by galvanic means, such as zinc on iron.

It is also known that the more noble metals deposit from their salt solutions on less noble metals easily and without current, such as gold on silver. It is furthermore known that this process can be assisted with reducing agents. It is possible, for example, for nickel coatings to be deposited, from nickel salt solutions, on aluminum or steel surfaces, in the presence of hypophosphites, without any appreciable quantities of the metal surface to be coated passing into solution. The metal salt solutions used in these cases are either acid or alkaline.

It has also been proposed that in this currentless process to be performed with agents having a reducing effect, as opposed to the forces acting in accordance with the electrochemical series of the metals, those which oxidize more easily should be deposited from their neutrally reacting salt solutions on metals which oxidize less easily, e.g., zinc coatings from zinc salt solutions on iron.

It is obvious that great care must be applied in such a process in order to ensure the desired degree of success.

With currentless processes of this kind, for example, considerable quantities of reducing agent have to be used, particularly when noncyanogen zinc baths are employed, so that these currentless methods, apart from the longer time involved, are very expensive.

Even if galvanic zinc baths, when used for the galvanization of iron surfaces, without any additives, provide the desired degree of success more quickly than is possible with the currentless process with the use of reducing agents, the amount of energy consumed is nevertheless fairly high; the voltage adopted in galvanic zinc baths is usually 10–15 v., and in 45 minutes zinc coatings of about 10μ are obtained if the galvanizations are effected in drum- or bell-shaped vessels. In the case of stationary baths, voltages of between 2 and 10 v. are adopted, and this ensures deposit speeds of between 0.5 and 1μ/min.

Galvanic processes have become known, one of which is based on the use of an ammoniacal electrolyte, an anode of magnetite being suggested for use in the ammoniacal electrolyte, in order to prevent decomposition of the

2 ammonia. Experts always took the view that, although ammoniacal electrolytes offered many advantages, decomposition of the ammonia would result in breakdowns and losses. Baths of this kind are subject to the drawback that the metal deposited on the anode emanates wholly from the bath solution, because metal from the anode naturally does not go into solution. A method of this kind has not gained a footing in practice, because supervision of the baths for practical purposes is too difficult and expensive. In addition, anodes of magnetite, owing to the limited conductivity, involve high voltage losses which greatly detract from the economic advantage of the process. This far outweighs the remaining advantages of an ammoniacal solution, and a process of this kind is far less satisfactory economically than the use of acid or cyanogenous baths, in which the material deposited always goes into solution from the anode and the latter has relatively high conductivity.

In a further process attempts have been made to produce galvanic deposits by means of a very low voltage. These processes, likewise, have failed to gain a footing in practice, because with voltages up to 1 v. the deposit speed was so low that it has hitherto not been possible to operate them economically. This follows particularly from the fact that it has been found in this process that when an electric current of not more than 1 v. is passed through an electrolyte a current density of not more than 1 a./dm.$^2$ is obtained. This, even if the current were utilized to the extent of 100%, in the case of a galvanic zinc bath, would only provide a deposit of about 1.22 g. of zinc per hour per dm.$^2$ of surface, or correspond to a deposit speed of only 0.285μ/min.

Since, however, the known process involves a considerable addition of carbohydrates, such as gum arabic, sugar, etc., the highest current utilization to be expected is 50–60%, so that here again the method cannot prove economically satisfactory.

In practice, as is known, two types of galvanic bath have gained a footing:

Firstly, baths operated in the very acid range and usually containing metal salts in conjunction with acids as solvents, as well as additives which are intended to influence the conductivity and the dispersion power of the galvanic baths. For these baths, additives are also known which act on the structure of the deposit—such as gelatine, in combination with other metal salts, or organic lustering additives.

Secondly, highly alkaline baths are known, which as a rule contain not only an inorganic base, such as NaOH, but also considerable quantities of potassium cyanide and/or sodium cyanide and/or other metal cyanides.

The acid baths usually operate with a very satisfactory utilization of the current, i.e., almost 100%, but suffer from the drawback of very inadequate dispersion power, besides providing, in some cases, very brittle deposits, by reason of the considerable absorption of water.

The cyanide baths usually necessitate high voltages (3/12 v.) in order to ensure current densities of 2–6 a./dm.$^2$, and the utilization of the current decreases with increasing voltage.

It is also known that in various cases attempts have been made, in the case of alkaline baths, to replace the cyanides by other complex-forming agents; it has been proposed, for example, to use an alkylene polyamine as an alkaline complex-forming agent. Owing to the considerable quantities of organic additives of this kind, e.g., 180 g. of ethylene diamine per liter of electrolyte, the conductivity of the bath is reduced to such an extent that high voltages become necessary, and at the same time only low current densities (1.1 to 2.2 a./dm.$^2$) can be obtained. Such baths have thus not proved successful in practice, because here again economically satisfactory operation is hardly possible.

The purpose of the present invention is to provide a process in which, as a general principle, less noble metals are deposited practically without current on more noble metals, and the disadvantages of the processes hitherto known are obviated.

It has been found, in fact, that if the electrochemical process, particularly for this converse type of depositing action, is combined with the use of a reduction agent, with the aid of a low bath voltage, considerable economic advantages are obtained, surpassing those to be expected.

In this connection it has been found, surprisingly enough, that the decomposition of ammonia, a phenomenon already known in itself and regarded as undesirable, can be particularly advantageous if the chemical processes in the bath are controlled in such a manner that the reducing agent is created, by oxidation, as a secondary product of decomposition, which then reduces the metal salt, a considerable quantity of energy then being released, which serves for the depositing of the metal, so that the external voltage of the electrolytic cell is reduced to the extent of the energy made available for use, by the chemical oxidation of the reducing agent, in the bath.

The invention consists of a process for the production of metal coatings on more noble metals from aqueous solutions with the use, as the cathode, of the metal objects to be coated. The process is characterized by the fact that the aqueous solutions contain one or more salts of the less noble metal to be used for the coatings, an organic and/or inorganic base, and an acid, particularly an organic acid, for the formation of a buffer, and a reducing agent, a pH value of between 5 and 8 being maintained, with the less noble metal being used as the anode, and the voltage corresponding to at least the potential difference between the metal used for the coating and the metal to be coated, but being below the decomposition voltage of the water, i.e., 1.23 v., and preferably below 1 v.

A further characteristic of the invention is that ethylenediamine hydrate and/or ammonium hydroxide is used as the base, while acetic acid and/or formic acid is used as the acid.

A further characteristic of the invention resides in the fact that organic and/or inorganic compounds, such as hydrazine hydrate, formaldehyde, sodium hypophosphite, or mixtures thereof, are used as reducing agents.

The invention also provides that the reduction agents are only formed in the bath, such as hydrazine, by the oxidation of ammonium hydroxide.

A further characteristic of the invention is that the bases and acids to be added to the bath are used in equivalent quantities.

A further characteristic of the invention resides in the fact that the process is carried out at a bath temperature of 50–90° C., preferably 60–70° C.

Yet a further characteristic of the invention is that the quantity of the bases to be added is increased, in relation to the quantity of acids, until the pH value of the bath solution is over 8, preferably 8–12.

The bath solution to which the invention relates can be given additions of catalytically acting compounds of high molecular weight, such as gelatines and/or starch, casein, bone meal or similar substances.

To increase the depositing speed of the baths to which the invention relates, a further characteristic of the invention provides that the bath voltage can also exceed 1.23 v., by about double, but it should preferably be up to 2 v.

Further characteristics, advantages and possible applications of the invention will emerge from the following examples and from the description given in each case.

EXAMPLE 1

In accordance with the invention, a bath, for example for the production of zinc deposits on iron, has the following composition per liter of electrolyte:

| | | |
|---|---|---|
| Zinc oxide | g | 20 |
| Ethylenediamine hydrate | cm.$^3$ | 30 |
| Acetic acid | cm.$^3$ | 100 |
| Hydrazine hydrate | cm.$^3$ | 20 |
| Organic wetting agent | g | 5 |
| Water | cm.$^3$ | 870 |

In general, the process to which the invention relates is carried out as follows: zinc compounds, such as zinc oxide and/or zinc salts, such as zinc sulphate, are suspended and/or dissolved in water. To this solution or suspension is added an inorganic and/or organic base, such as ammonium hydroxide and/or ethylenediamine hydrate ($(C_2H_4(NH_2)_2 xH_2O)$) and the pH value set, by means of a preferably organic acid, such as acetic acid, to between 5 and 8, preferably 7. From these added bases and acids the appropriate salts, acting as buffers, form in the bath. An example of the reduction agent used is hydrazine hydrate.

The quantitative composition of these baths can be modified without difficulty, according to whether the deposit speed of the zinc is required to be greater or smaller or according to what structure is required in the zinc coating applied. Lustering agents can also be added to the baths in the known manner.

During the immersion of the objects to be coated with zinc the baths are set to constant temperatures of between 50 and 90° C., preferably 60–70° C.

When an iron plate with an area of 108 cm.$^2$ was immersed for 5 minutes at the voltage of 0.35 v. in a zinc bath of the foregoing composition, 61.5 mg. of zinc was deposited, corresponding to a coating thickness of 0.8$\mu$. This was repeated, at 0.5 v., for a period of 5 minutes, after which an increase of 90.6 mg., corresponding to a coating thickness of 1.2$\mu$, was observed. The voltage was then increased to 1 v., and an immersion of 5 minutes was carried out at 1.3 a., in which process 242.4 mg. was deposited, corresponding to a coating thickness of 3.14$\mu$.

The test thus carried out showed that even at a voltage of 0.35 v. zinc is already deposited. Since, however, this voltage is far below the decomposition voltage of the electrolyte, it follows that the zinc was deposited from the solution on the iron as a result of chemical reduction.

With a voltage of 0.3 v., on the other hand, no deposit was found to take place, so that it must be concluded that at least a potential difference of 0.323 v. has to be applied in order to ensure a deposit of zinc on the iron plate.

The last test carried out, lasting 5 minutes, and giving a deposit of 242.4 mg. of zinc, clearly shows that in actual fact a considerable quantity of the zinc was deposited not by electrical energy but by the reduction agents present in the bath, for the electrochemical equivalent of zinc amounts to about 1.22 mg./a., so that with 100% utilization of the current only 132 mg. of zinc can be deposited in 5 minutes with 1.3 a.

The zinc coating obtained was uniform in its color and structure. It was ductile and lent itself to the deep-drawing process without developing cracks.

In place of the example given for the depositing of zinc on iron, the process to which the invention relates also enables other metals to be deposited on metals correspondingly more resistant to oxidation.

Instead of hydrazine hydrate the reducing agent may be formaldehyde, sodium hypophosphite or mixtures thereof.

The processes carried out in accordance with the invention, by comparison with those hitherto known, offers the considerable advantage that, on the one hand, the zinc is deposited far more rapidly, while on the other hand the operation is carried out with a far more moderate input of electrical energy and also of chemicals. In addition, ordinary commercial chemicals (of industrial purity) can be employed. Furthermore, the baths to be used in accordance with the invention offer the significant advantage of being free of cyanogen compounds and also of operating in the neutral range, whereby in particular, the cost of water-decontamination is lowered.

EXAMPLE 2

If the reduction agent is not to be formed until the material reaches the bath, then in the case of a composition similar to Example 1 the resulting starting substance must be added in a considerable quantity, in place of the primarily added reduction agent, such as hydrazine, so that the reduction agent can form by oxidation of $NH_4OH$, retaining the necessary pH value, like hydrazine.

The composition of the bath per liter of electrolyte is thus as follows:

| | | |
|---|---|---|
| Zinc oxide | g./l | 46 |
| Ammonium hydroxide | ml | 300 |
| Formic acid | ml | 150 |
| Gelatine | g./l | 20 |
| Water | ml | 300 |

In the preparation of the bath ZnO is suspended, for example, with a certain quantity of water. The formic acid is then added, while stirring. In this process the zinc oxide passes into solution. If necessary the mixture is further stirred, while increasing the temperature, until a clear solution is obtained. Ammonium hydroxide (density 0.91) is now added direct to the solution. With a pH value of about 7 the mixture is now supplemented with the remaining water. If the solution becomes too hot when $NH_4OH$ is added, i.e. if the temperature amounts to over 80–90° C., the mixture is cooled and gelatine then added for smoothing purposes.

With the applied voltage of at least 0.323 v., i.e., the potential difference between zinc and iron, ammonia is added first of all in order to neutralize the hydrogen ions, which are anodically oxidized to hydrazine on a further addition of ammonia.

This hydrazine reduces the dissolved zinc formate, and the potential difference to iron no longer opposes the depositing of the metallic zinc, because this potential difference is, of course, applied as an external voltage. In this process the hydrazine itself oxidizes to nitrogen, which escapes from the cathode in the form of gas.

Owing to the reduction of the zinc, formic acid is again released, and this again reacts with zinc, to form zinc formate, so that further hydrogen ions are released. As the applied voltage is very low, the hydrogen ions remain in the bath, thus acidifying the latter. The hydrogen ions are again neutralized by means of ammonia, and the entire process starts again, more or less in accordance with the following Equations a and b:

(a) 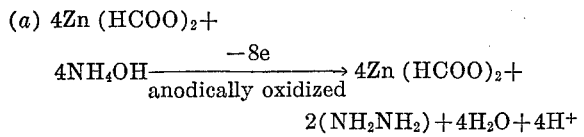

(b) 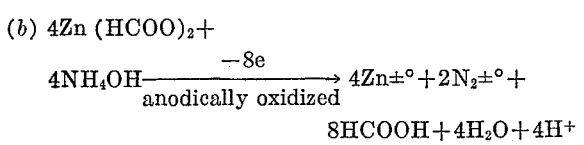

The actual reducing agent, i.e., hydrazine, is thus produced in the bath itself, and in every case only to that quantity in which it is consumed. The purpose of the addition of the ammonium hydroxide is to maintain the preselected pH value, which should be between 7 and 8.5 in order to ensure optimum result in this process.

The temperatures are kept between 50 and 90° C., as in Example 1.

The following are the results obtained in various series of tests:

TABLE 1

| | No. 1 | No. 2 | No. 3 | No. 4 |
|---|---|---|---|---|
| Deposit time (min.) | 9 | 5 | 5 | 5 |
| Temp. of bath (° C.) | 74 | 68 | 60 | 65 |
| pH value | 7.5 | 7.5 | 8.2 | 8.5 |
| Voltage (v.) | 0.8 | 1.0 | 1.0 | 1.2 |
| Current (a.) | 20 | 21 | 22 | 27 |
| Area of plate coated (cm.²) | 2.9.8 | 205 | 208 | 217 |
| Quantity of zinc deposited (g.) | 3.4616 | 2.1729 | 2.5742 | 2.8081 |
| Zinc coating (µ) | 22.18 | 14.9 | 17.35 | 18.2 |
| Deposit speed (µ/min.) | 2.49 | 2.98 | 3.47 | 3.64 |

As is apparent from Table 1 the current density varies from 9.1 a./dm.² of No. 1 to 12.44 a./dm.² of No. 4. Thus the current density is always about 9 a./dm.² or greater.

The process to which the invention relates thus enables a greater absolute quantity of zinc to be deposited, and also a greater quantity per unit time, although of course, in accordance with the current density. The average deposit speed is between 2 and 4µ/min. and in the case of wires it can even increase to 10µ/min.

In contrast to this, the average in the case of galvanic processes carried out with cyanides is about 1µ/min. at voltages of between 6 and 16 v.

The deposit speed obtained with the process to which the invention relates depends not only on the voltage and the pH value, which can increase to about 8.5, but also on the temperature. This latter should be as low as possible, while the voltage should be as high as possible, i.e., should almost reach the decomposition voltage of the water.

The applied voltage thus corresponds to the sum of the potential difference of the galvanic chain and the voltage required for the anodic oxidation of the ammonia to the reduction agent forming in the bath.

It is naturally possible, in place of an acid for the dissolution of the metal to be used in the bath, to add a base in a quantity ensuring that the latter will form with the metal a soluble complex compound and also that the reducing agent for the metal will be produced in the bath. In this case, however, the pH range of the bath is 8–12.

In the depositing process carried out in accordance with the invention the bath is extremely stable; zinc will not flocculate, either in the alkaline or in the acid range. It is only with phosphoric acid that the zinc can be removed from the bath solution. The bath itself can be used for a long time, and all that it consumes, apart from the very low current, is ammonium hydroxide, which is obtainable as an inexpensible waste product. in the bath composition, needless to say, other zinc salts can be used as well. Zinc oxide is merely advantageous on account of its low price.

In contrast to the galvanic process, the low working voltages used in that to which the invention relates ensures that no hydrogen will form at the cathode and no oxygen at the anode.

The metallic coatings obtained are very dense and ductile. They show no oxygen embrittlement, such as has been observed in corresponding tests on deep-drawing plates of various grades of steel. The non-absorption of hydrogen shown by the tests is a great practical advantage, not only for deep-drawing plates but also for leaf springs, annular springs and other hardened objects of steel.

EXAMPLE 3

In the processes to which the invention relates it has been found that compounds of high molecular weight, such as gelatines and/or starch, casein, bone meal or similar substances, not only result in a finer grain in the coatings obtained but, in the production of the reducing agent in the bath itself, e.g., in the anodic oxidation of the ammonia to hydrazine, also acts as catalysts, thus accelerating and increasing the hydrazine yield. In corresponding tests baths were tried out without the addition of gelatines or catalysts of this kind, but it was found that the depositing action and the dispersion in the bath were far lower than in baths with an addition of gelatine. In galvanic processes, on the other hand, an addition of gelatine decreases the conductivity of the bath and thus results in a lower yield.

EXAMPLE 4

The tests recorded below relate to the increase of the depositing speed when the voltage is increased beyond the decomposition voltage of the water. Sheet iron was coated with zinc which was separated from the following electrolyte:

Bath composition per liter of electrolyte:

| | | |
|---|---|---|
| Zinc oxide | g | 45 |
| Formic acid (85%) | ml | 180 |
| Ammonia (density 0.91) | ml | 300 |
| Potassium chloride | g | 50 |
| Sodium tetraborate | g | 10 |
| Gelatine | g | 5 |
| Water | | Residue |

The distance from the anode to the cathode was 70 mm., and the ratio of the area of the anode to that of the cathode was 1:1. Cast zinc plates were used as the anode material. The test was carried out with a bath in motion.

The test results are given as follows (see Table 2):

TABLE 2

| | |
|---|---|
| Duration of deposition operation (min.) | 2 |
| Bath temperature (° C.) | 60 |
| pH value | 7.8 |
| Voltage (v.) | 1.8 |
| Current intensity (a.) | 40 |
| Current density (a./dm.$^2$) | 15 |
| Area of sheet-metal coated (cm.$^2$) | 270 |
| Quantity of zinc deposited (g.) | 1.53 |
| Zinc coating ($\mu$) | 8 |
| Depositing speed ($\mu$/min.) | 4 |

In these tests it was found possible to obtain a depositing speed of 4–6$\mu$/min.

This is significant inasmuch as in galvanic processes with cyanide baths only 1–1.2$\mu$/min. and with acid processes 4–5 $\mu$/min. or 10$\mu$/min. at the most, can be obtained, where the coating thickness is concerned. In the latter case, however, 10 v. has to be applied, and far more gas is then developed, the dispersion in acid baths of this kind being considerable.

In this variant of the process to which the invention relates, therefore, the bath voltage exceeds the decomposition of the water, i.e., 1.23 v., which as a general principle is not to be exceeded, and preferably ranges up to 2 v. All other factors and test conditions, however, remain the same as in the methods described in the foregoing for the performance of the process to which the invention relates.

Needless to say, a voltage of up to 2 v. will also result in the formation of a certain amount of hydrogen, but it has been found that this does not detract from the ductility of the coatings.

I claim:
1. A process for the production of zinc coatings on more noble metals comprising steadily passing a constant electric current to a cathode of the more noble metal object to be coated from an anode of zinc metal through an aqueous solution bath which contains at least one salt of zinc, a base, an acid, and a reducing agent, the pH value of the aqueous solution being between about 5 and about 8, the current density being at least 9 a./dm.$^2$, and the voltage corresponding to at least the potential differences between the metal used for the coating and the metal to be coated and being no greater than 2 v.

2. A process in accordance with claim 1, including employing a bath temperature of 50–90° C.

3. A process in accordance with claim 2 wherein the bath temperature is 60–70° C.

4. A process in accordance with claim 1 wherein said reducing agent is selected from the group consisting of hydrazine hydrate, formaldehyde, sodium hypophosphite and mixtures thereof.

5. A process in accordance with claim 4 wherein said base is selected from the group consisting of ethylene diamine hydrate, ammonium hydroxide and mixtures thereof, and said acid is selected from the group consisting of acetic acid, formic acid and mixtures thereof.

6. A process in accordance with claim 1, wherein the base and acid are used in equivalent quantities.

7. A process in accordance with claim 1 wherein said base is selected from the group consisting of ethylenediamine hydrate, ammonium hydroxide and mixtures thereof.

8. A process in accordance with claim 1 wherein said acid is selected from the group consisting of acetic acid, formic acid and mixtures thereof.

9. A process in accordance with claim 1 wherein a compound selected from the group consisting of gelatine, starch, casein, bone meal and mixtures thereof is added to the bath solution.

10. A process in accordance with claim 1 wherein the bath voltage is no greater than about 1 v.

11. A process in accordance with claim 1 wherein the bath voltage is no greater than about 1.23 v.

12. A process in accordance with claim 1 including forming the reducing agent in situ in the bath by the oxidation of ammonium hydroxide to form hydrazine.

13. A process in accordance with claim 1 including forming the reducing agent in situ in the bath with the base being inorganic and the acid being organic.

14. A process in accordance with claim 1 wherein said zinc is deposited at a speed of at least 2$\mu$/min.

References Cited

UNITED STATES PATENTS

| | | | |
|---|---|---|---|
| 2,886,499 | 5/1959 | Schaer et al. | 204—41 |
| 2,271,209 | 1/1942 | Schlötter | 204—54 |
| 2,644,787 | 7/1953 | Bonn et al. | 204—43 |
| 2,879,175 | 3/1959 | Umblia et al. | 106—1 XR |
| 3,032,436 | 5/1962 | Gostin et al. | 117—130 XR |
| 3,198,659 | 8/1965 | Levy | 106—1 XR |
| 3,264,199 | 8/1966 | Fassell et al. | 204—38 |
| 3,303,111 | 2/1967 | Peach | 204—43 XR |
| 3,317,412 | 5/1967 | Dahlmann | 204—55 |

JOHN H. MACK, Primary Examiner

G. L. KAPLAN, Assistant Examiner

U.S. Cl. X.R.

204—45